(12) United States Patent
Srinivasan et al.

(10) Patent No.: US 8,204,875 B2
(45) Date of Patent: Jun. 19, 2012

(54) SUPPORT FOR USER DEFINED AGGREGATIONS IN A DATA STREAM MANAGEMENT SYSTEM

(75) Inventors: Anand Srinivasan, Bangalore (IN);
Namit Jain, Santa Clara, CA (US);
Shailendra Kumar Mishra, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 13/184,528

(22) Filed: Jul. 16, 2011

(65) Prior Publication Data
US 2011/0270879 A1    Nov. 3, 2011

Related U.S. Application Data

(62) Division of application No. 11/977,439, filed on Oct. 20, 2007, now Pat. No. 7,991,766.

(51) Int. Cl.
*G06F 7/00* (2006.01)
(52) U.S. Cl. .................... 707/713; 707/769
(58) Field of Classification Search .................. 707/713, 707/714, 715, 718, 769
See application file for complete search history.

(56) References Cited

U.S. PATENT DOCUMENTS

| | | | |
|---|---|---|---|
| 5,495,600 A | 2/1996 | Terry et al. | |
| 5,706,494 A * | 1/1998 | Cochrane et al. | 1/1 |
| 5,822,750 A | 10/1998 | Jou et al. | |
| 5,826,077 A | 10/1998 | Blakeley et al. | |
| 5,857,182 A | 1/1999 | DeMichiel et al. | |
| 6,006,235 A | 12/1999 | Macdonald et al. | |
| 6,081,801 A * | 6/2000 | Cochrane et al. | 1/1 |
| 6,278,994 B1 | 8/2001 | Fuh et al. | |
| 6,453,314 B1 * | 9/2002 | Chan et al. | 1/1 |
| 6,546,381 B1 | 4/2003 | Subramanian et al. | |
| 6,708,186 B1 | 3/2004 | Claborn et al. | |
| 6,836,778 B2 | 12/2004 | Manikutty et al. | |
| 6,985,904 B1 | 1/2006 | Kaluskar et al. | |
| 7,310,638 B1 | 12/2007 | Blair | |
| 7,376,656 B2 * | 5/2008 | Blakeley et al. | 717/108 |
| 7,383,253 B1 | 6/2008 | Tsimelzon et al. | |
| 7,403,959 B2 | 7/2008 | Nishizawa et al. | |
| 7,673,065 B2 | 3/2010 | Srinivasan et al. | |
| 7,953,728 B2 * | 5/2011 | Hu et al. | 707/719 |
| 8,073,826 B2 * | 12/2011 | Srinivasan et al. | 707/702 |
| 2003/0037048 A1 | 2/2003 | Kabra et al. | |
| 2004/0064466 A1 | 4/2004 | Manikutty et al. | |

(Continued)

OTHER PUBLICATIONS

Arasu, A. et al. "STREAM: The Stanford Data Stream Management System", Department of Computer Science, Stanford University, 2004, pp. 21.

(Continued)

*Primary Examiner* — Hung T Vy
(74) *Attorney, Agent, or Firm* — Silicon Valley Patent Group LLP; Omkar Suryadevara

(57) ABSTRACT

A computer is programmed to accept a command to create a new aggregation defined by a user during execution of continuous queries on streams of data. The computer is further programmed to thereafter accept and process new continuous queries using the new aggregation, in a manner similar to built-in aggregations. The user typically writes a set of instructions to perform the new aggregation, and identifies in the command, a location of the set of instructions. In response to such a command, the computer creates metadata identifying the new aggregation. The metadata is used to instantiate one aggregation for each group of data in a current window, grouped by an attribute identified in a new query.

20 Claims, 7 Drawing Sheets

U.S. PATENT DOCUMENTS

| | | |
|---|---|---|
| 2004/0220912 A1 | 11/2004 | Manikutty et al. |
| 2004/0220927 A1 | 11/2004 | Murthy et al. |
| 2004/0267760 A1 | 12/2004 | Brundage et al. |
| 2005/0055338 A1 | 3/2005 | Warner et al. |
| 2005/0065949 A1 | 3/2005 | Warner et al. |
| 2005/0096124 A1 | 5/2005 | Stronach |
| 2005/0177579 A1* | 8/2005 | Blakeley et al. ............ 707/100 |
| 2005/0229158 A1 | 10/2005 | Thusoo et al. |
| 2005/0289125 A1 | 12/2005 | Liu et al. |
| 2006/0031204 A1 | 2/2006 | Liu et al. |
| 2006/0100969 A1 | 5/2006 | Wang et al. |
| 2006/0224576 A1 | 10/2006 | Liu et al. |
| 2006/0230029 A1 | 10/2006 | Yan |
| 2006/0235840 A1 | 10/2006 | Manikutty et al. |
| 2007/0022092 A1 | 1/2007 | Nishizawa et al. |
| 2007/0136254 A1 | 6/2007 | Choi et al. |
| 2007/0294217 A1 | 12/2007 | Chen et al. |
| 2008/0028095 A1 | 1/2008 | Lang et al. |
| 2008/0046401 A1 | 2/2008 | Lee et al. |
| 2008/0114787 A1 | 5/2008 | Kashiyama et al. |
| 2008/0301124 A1 | 12/2008 | Alves et al. |
| 2009/0043729 A1 | 2/2009 | Liu et al. |
| 2009/0070786 A1 | 3/2009 | Alves et al. |
| 2009/0106189 A1 | 4/2009 | Jain et al. |
| 2009/0106190 A1 | 4/2009 | Srinivasan et al. |
| 2009/0106198 A1 | 4/2009 | Srinivasan et al. |
| 2009/0106214 A1 | 4/2009 | Jain et al. |
| 2009/0106215 A1 | 4/2009 | Jain et al. |
| 2009/0106440 A1 | 4/2009 | Srinivasan et al. |
| 2009/0248749 A1 | 10/2009 | Gu et al. |

OTHER PUBLICATIONS

Chandrasekaran, S. et al. "TelegraphCQ: Continuous Dataflow Processing for an Uncertain World", Proceedings of CIDR 2003, pp. 12.
Chen, J. et al. "NiagaraCQ: A Scalable Continuous Query System for Internet Databases", Proceedings of 2000 ACM SIGMOD, pp. 12.
Terry, D.B. et al. "Continuous queries over append-only databases", Proceedings of 1992 ACM SIGMOD, pp. 321-330.
Arasu, A. et al. "The CQL Continuous Query Language: Semantic Foundation and Query Execution", VLDB Journal, vol. 15, Issue 2, Jun. 2006, pp. 32.
Arasu, A. et al. "An Abstract Semantics and Concrete Language for Continuous Queries over Streams and Relations", $9^{th}$ International Workshop on Database programming languages, Sep. 2003, pp. 12.
Babu, S. et al. "Continuous Queries over Data Streams", SIGMOD Record, Sep. 2001, pp. 12.
Oracle Database, SQL Reference, 10g Release 1 (10.1), Part No. B10759-01, Dec. 2003, pp. 7-1 to 7-17; 7-287 to 7-290; 14-61 to 14-74.
Stolze, K. "User-defined Aggregate Functions in DB2 Universal Database", available at http://www.128.ibm.com/developerworks/db2/library/techarticle/0309stolze/0309stolze.html, Sep. 11, 2003, pp. 11.
Novick, A. "Creating a User Defined Aggregate with SQL Server 2005", available at http://novicksoftware.com/Articles/sql-2005-product-user-defined-aggregate.htm, 2005, pp. 5.
PostgresSQL: Documentation: Manuals: PostgresSQL 8.2: User-Defined Aggregates, believed to be prior to Apr. 21, 2007, pp. 4.
PostgresSQL: Documentation: Manuals: PostgresSQL 8.2: Create Aggregate, believed to be prior to Apr. 21, 2007, pp. 5.
Golab, L. "Sliding Window Query Processing over Data Stream", University of Waterloo, Technical reports CS-2006-27.
Sharaf et al. "Efficient Scheduling of Heterogeneous Continuos Queries", VLDB '06, Sep. 12-15, 2006, pp. 511-522.
Munagala, K. et al. "Optimization of Continuous Queries with Shared Expensive Filters", Proceedings of the 26th ACM SIGMOD-SIGACT-SIGART symposium on Principles of database systems, believed to be prior to Oct. 17, 2007, pp. 14.
Buza, A. "Extension of CQL over Dynamic Databases", Journal of Universal Computer Science, vol. 12, No. 9, 2006, pp. 12.
Avnur, R. et al. "Eddies: Continuously Adaptive Query Processing", In Proceedings of the 2000 ACM SIGMOD International Conference on Management of Data, Dallas, TX, May 2000, pp. 12.
Avnur, R. et al. "Eddies: Continuously Adaptive Query Processing", slide show, believed to be prior to Oct. 17, 2007, pp. 4.
Madden, S. et al. "Continuously Adaptive Continuous Queries (CACQ) over Streams", SIGMOD, 2002, pp. 6.
Deshpande, A. et al. "Adaptive Query Processing", believed to be prior to Oct. 17, 2007, pp. 27.
Widom, J. et al. "CQL: A Language for Continuous Queries over Streams and Relations", believed to be prior to Oct. 17, 2007, pp. 31.
Motwani, R. et al. "Models and Issues in Data Stream Systems", Proceedings of the $21^{st}$ ACM SIGMOD-SIGACT-SIGART symposium on Principles of database systems, 2002, pp. 26.
Widom, J. et al. "The Stanford Data Stream Management System", believed to be prior to Oct. 17, 2007, pp. 24.
Oracle Application Server 10 g Release 2 and 3, New Features Overview, An Oracle White Paper, Oct. 2005, pp. 48.
Oracle Database, SQL Language Reference, 11 g Release 1 (11.1), B28286-02, Sep. 2007, pp. 144.
Stream Query Repository: Online Auctions, http://www.db.stanford.edu/stream/sqr/onauc.html#queryspecsend , Dec. 2, 2002, pp. 2.
Stream Query Repository: Online Auctions (CQL Queries), http://www.db.stanford.edu/stream/sqr/cql/onauc.html , Dec. 2, 2002, pp. 3.
Carpenter, D. "User Defined Functions", available at http://www.sqlteam.com/itemprint.asp?ItemID=979 , Oct. 12, 2000, pp. 4.
Diao, Y. "Query Processing for Large-Scale XML Message Brokering", 2005, University of California Berkeley, pp. 226.
Diao, Y. et al. "Query Processing for High-Volume. XML Message Brokering", Proceedings of the $29^{th}$ VLDB Conference, Berlin, Germany, 2003, pp. 12.
Jin, C. et al. "ARGUS: Efficient Scalable Continuous Query Optimization for Large-Volume Data Streams", $10^{th}$ International Database Engineering and Applications Symposium (IDEAS'06), 2006, pp. 7.
Bose, S. et al., "A Query Algebra for Fragmented XML Stream Data", $9^{th}$ International Workshop on Data Base Programming Languages (DBPL), Sep. 2003, Postdam, Germany, http://lambda.uta.edu/dbpl03.pdf, pp. 11.
Fernandez, Mary et al., "Build your own XQuery processor", http://edbtss04.dia.uniroma3.it/Simeon.pdf, Nov. 2004, pp. 116.
Fernandez, Mary et al., Implementing XQuery 1.0: The Galax Experience:, Proceedings of the $29^{th}$ VLDB Conference, Berlin, Germany, 2003, pp. 4.
Florescu, Daniela et al., "The BEA/XQRL Streaming XQuery Processor", Proceedings of the $29^{th}$ VLDB Conference, 2003, Berlin, Germany, pp. 12.
Gilani, A. Design and implementation of stream operators, query instantiator and stream buffer manager, Dec. 2003, pp. 138.
Arasu A. "CQL: A Language for Continuous Queries over Streams and Relations", 2004, Lecture Notes in Computer Science, vol. 2921/2004, pp. 1-19.
Non-Final Rejection dated Dec. 3, 2009 in U.S. Appl. No. 11/874,202.
Amendment dated Apr. 8, 2010 in U.S. Appl. No. 11/874,202.
Final Rejection dated Jun. 8, 2010 in U.S. Appl. No. 11/874,202.
Amendment filed with RCE dated Sep. 8, 2010 in U.S. Appl. No. 11/874,202.
Examiner Interview Summary dated Sep. 14, 2010 in U.S. Appl. No. 11/874,202.
Notice of Allowance dated Dec. 22, 2010 in U.S. Appl. No. 11/874,202.
Notice of Allowance dated Mar. 31, 2011 in U.S. Appl. No. 11/874,202.
Applicant Summary of Interview dated Jun. 30, 2011 in U.S. Appl. No. 11/874,202.
Preliminary Amendment dated Oct. 16, 2009 in U.S. Appl. No. 11/874,896.
Non-Final Rejection dated Dec. 8, 2009 in U.S. Appl. No. 11/874,896.
Amendment dated Apr. 8, 2010 in U.S. Appl. No. 11/874,896.
Final Rejection dated Jul. 23, 2010 in U.S. Appl. No. 11/874,896.
Amendment filed with RCE dated Oct. 25, 2010 in U.S. Appl. No. 11/874,896.
Examiner Interview Summary dated Oct. 25, 2010 in U.S. Appl. No. 11/874,896.

Non-Final Rejection dated Nov. 22, 2010 in U.S. Appl. No. 11/874,896.
Amendment dated Feb. 22, 2011 in U.S. Appl. No. 11/874,896.
Applicant Summary of Interview dated May 23, 2011 in U.S. Appl. No. 11/874,896.
Terminal Disclaimer dated May 23, 2011 in U.S. Appl. No. 11/874,896 over U.S. Appl. No. 11/874,202.
Terminal Disclaimer dated May 23, 2011 in U.S. Appl. No. 11/874,896 over U.S. Appl. No. 11/977,439.
Terminal Disclaimer dated May 23, 2011 in U.S. Appl. No. 11/874,896 over U.S. Appl. No. 11/977,437.
Terminal Disclaimer dated May 23, 2011 in U.S. Appl. No. 11/874,896 over U.S. Appl. No. 7,673,065.
Terminal Disclaimer dated May 23, 2011 in U.S. Appl. No. 11/874,896 over U.S. Appl. No. 11/874,197.
Examiner Interview Summary dated May 23, 2011 in U.S. Appl. No. 11/874,896.
Notice of Allowance and Interview Summary dated Jun. 23, 2011 in U.S. Appl. No. 11/874,896,.
Terminal Disclaimer Review Decision dated Jun. 2, 2011 in U.S. Appl. No. 11/874,896.
Amendment after Notice of Allowance dated Sep. 23, 2011 in U.S. Appl. No. 11/874,896.
Response to Amendment dated Nov. 9, 2011 in U.S. Appl. No. 11/874,896.
Office Action dated Oct. 13, 2009 in U.S. Appl. No. 11/977,437.
Amendment dated Jan. 13, 2010 in U.S. Appl. No. 11/977,437.
Final Rejection dated Apr. 8, 2010 in U.S. Appl. No. 11/977,437.
Examiner Interview Summary dated Aug. 17, 2010 in U.S. Appl. No. 11/977,437.
Amendment filed with RCE dated Sep. 08, 2010 in U.S. Appl. No. 11/977,437.
Notice of Allowance dated Oct. 7, 2009 in U.S. Appl. No. 11/977,440.
Examiner Interview Summary dated Dec. 1, 2009 in U.S. Appl. No. 11/977,440.
Amendment after Notice of Allowance dated Dec. 5, 2009 in U.S. Appl. No. 11/977,440.
Response to Amendment dated Jan. 7, 2010 in U.S. Appl. No. 11/977,440.
Preliminary Amendment dated Oct. 14, 2009 in U.S. Appl. No. 11/874,197.
Second Preliminary Amendment dated Oct. 14, 2009 in U.S. Appl. No. 11/874,197.
Office Action dated Nov. 10, 2009 in U.S. Appl. No. 11/874,197.
Amendment dated Mar. 10, 2010 in U.S. Appl. No. 11/874,197.
Final Rejection dated Jun. 29, 2010 in U.S. Appl. No. 11/874,197.
Amendment filed with RCE dated Oct. 29, 2010 in U.S. Appl. No. 11/874,197.
Interview Summary dated Nov. 16, 2010 in U.S. Appl. No. 11/874,197.
Office Action dated Dec. 22, 2010 in U.S. Appl. No. 11/874,197.
Amendment dated May 23, 2011 in U.S. Appl. No. 11/874,197.
Final Rejection dated Aug. 12, 2011 in U.S. Appl. No. 11/874,197.
Amendment filed with RCE dated Jan. 12, 2012 in U.S. Appl. No. 11/874,197.
Preliminary Amendment dated Oct. 15, 2009 in U.S. Appl. No. 11/977,439.
Office Action dated Apr. 13, 2010 in U.S. Appl. No. 11/977,439.
Amendment dated Jul. 13, 2010 in U.S. Appl. No. 11/977,439.
Terminal Disclaimer dated Jul. 13, 2010 in U.S. Appl. No. 11/977,439 over U.S. Appl. No. 11/874,896.
Terminal Disclaimer dated Jul. 13, 2010 in U.S. Appl. No. 11/977,439 over U.S. Appl. No. 7,673,065.
Terminal Disclaimer dated Jul. 13, 2010 in U.S. Appl. No. 11/977,439 over U.S. Appl. No. 11/977,437.
Terminal Disclaimer Review Decision dated Aug. 10, 2010 in U.S. Appl. No. 11/977,439.
Notice of Allowance dated Aug. 18, 2010 in U.S. Appl. No. 11/977,439.
Supplemental Notice of Allowance dated Sep. 28, 2011 in U.S. Appl. No. 11/977,439.
Notice of Allowance dated Nov. 24, 2010 in U.S. Appl. No. 11/977,439.
Amendment dated Feb. 20, 2011 in U.S. Appl. No. 11/977,439.
Notice of Allowance dated Mar. 16, 2011 in U.S. Appl. No. 11/977,439.
Preliminary Amendment dated Oct. 15, 2009 in U.S. Appl. No. 11/874,202.
Interview Summary dated Mar. 2, 2010 in U.S. Appl. No. 11/874,202.

* cited by examiner

```
Q1: Select B, max(A)
    From   S1 [Rows 50,000]
    Group By B
```

```
Q2: Select Istream(*)
    From   S1 [Rows 40,000], S2 [Range 600 Seconds]
    Where  S1.A = S2.A
```

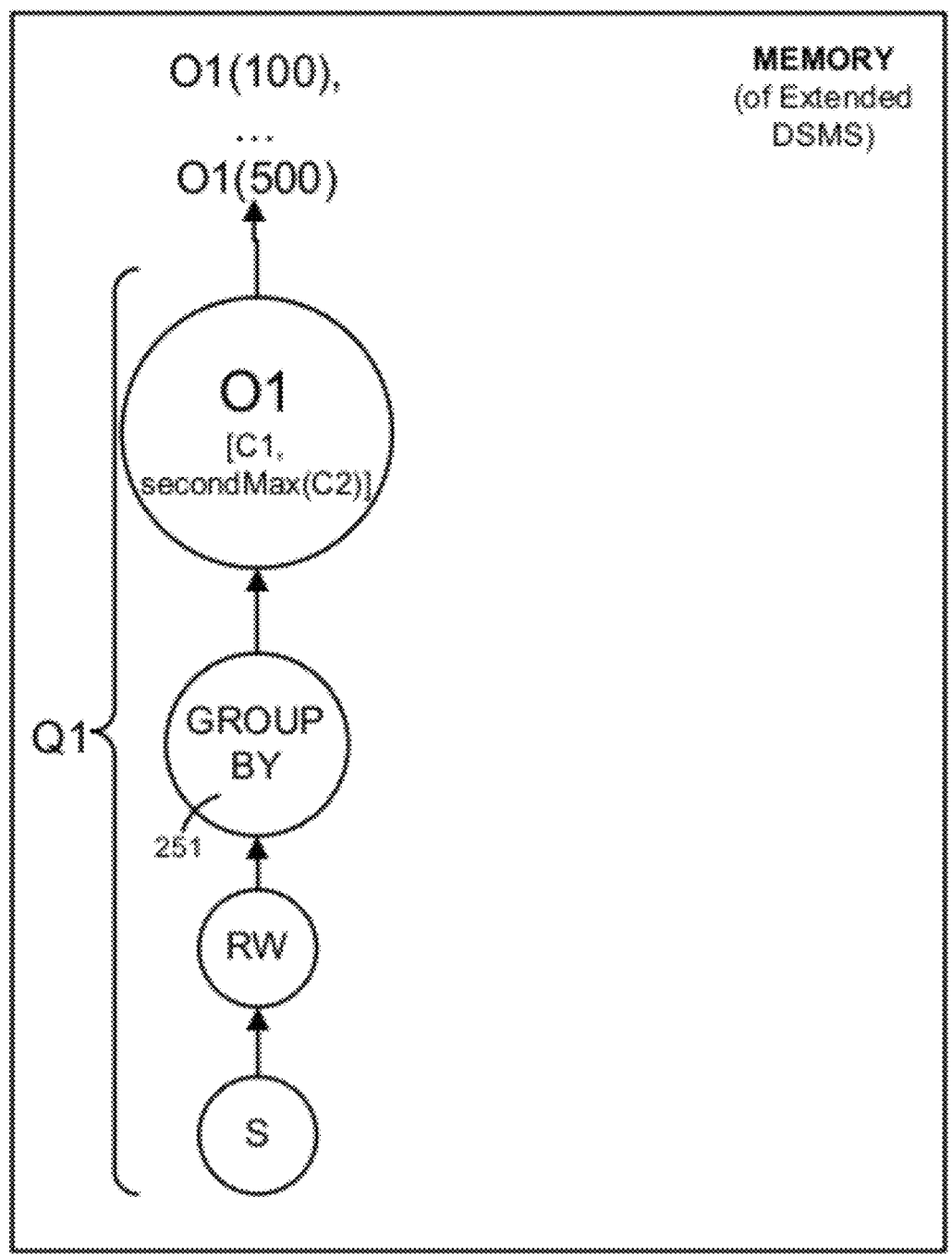

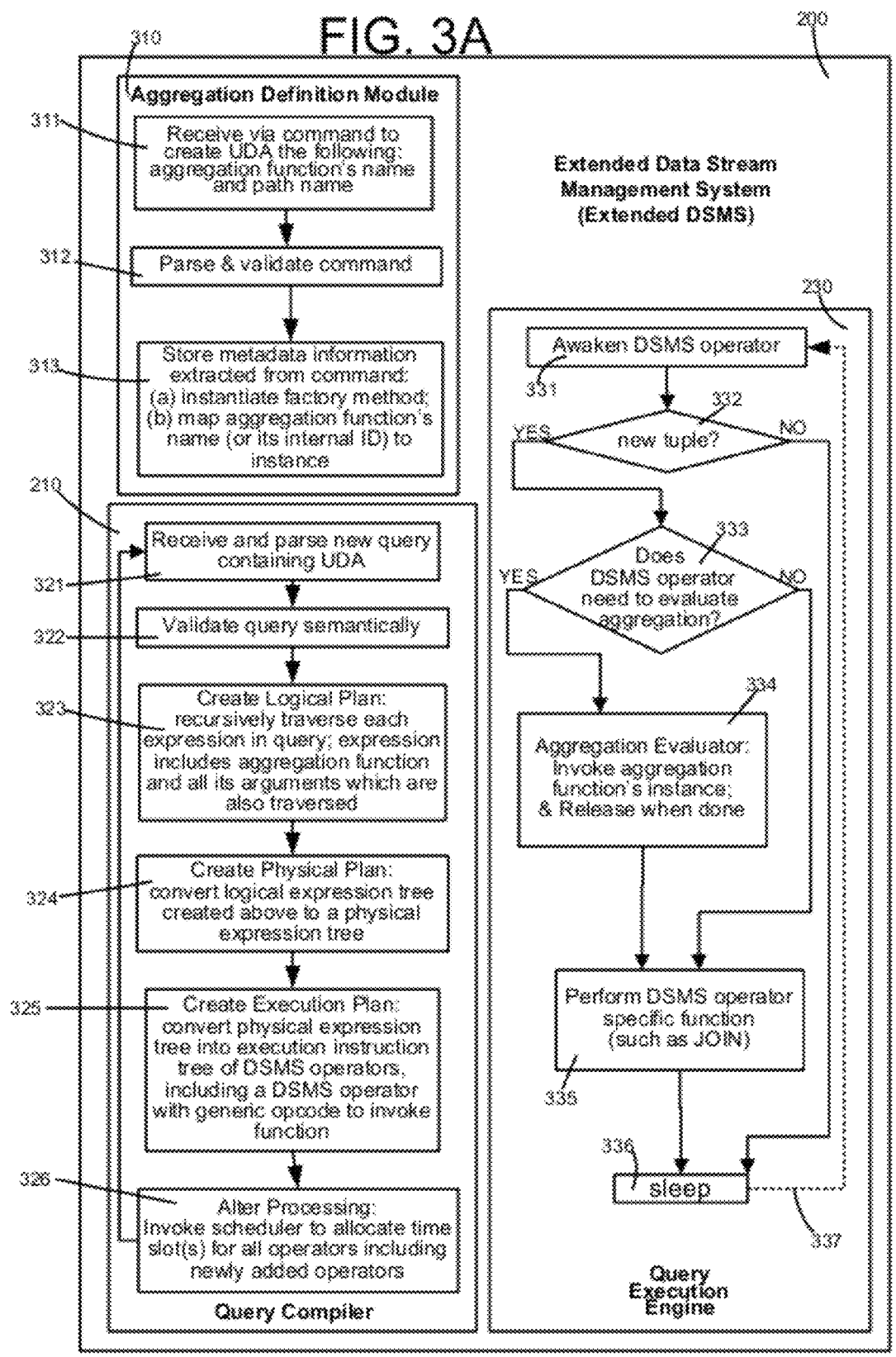

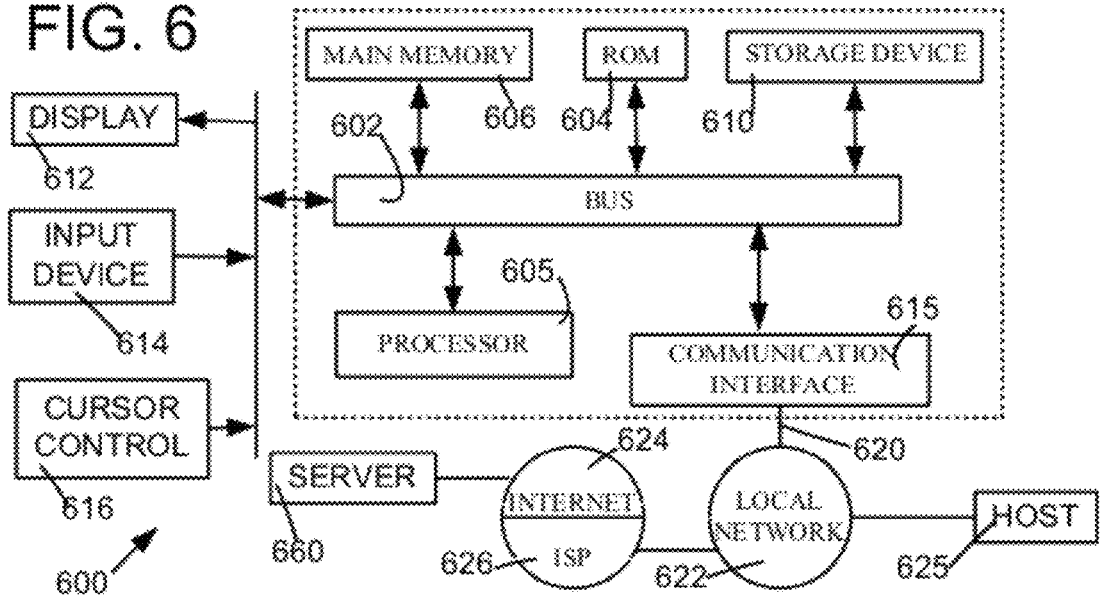

SUPPORT FOR USER DEFINED AGGREGATIONS IN A DATA STREAM MANAGEMENT SYSTEM

CROSS-REFERENCE TO PARENT APPLICATION

This application is a divisional application of U.S. application Ser. No. 11/977,439 entitled "SUPPORT FOR USER DEFINED AGGREGATIONS IN A DATA STREAM MANAGEMENT SYSTEM" filed on Oct. 20, 2007 that is incorporated by reference herein in its entirety.

CROSS-REFERENCE TO RELATED APPLICATIONS

This application is related to and incorporates by reference herein in its entirety, a commonly-owned U.S. application Ser. No. 11/977,437 entitled "SUPPORT FOR INCREMENTALLY PROCESSING USER DEFINED AGGREGATIONS IN A DATA STREAM MANAGEMENT SYSTEM" filed on Oct. 20, 2007 by the inventors of the current patent application.

This application is related to and incorporates by reference herein in its entirety, a commonly-owned U.S. application Ser. No. 11/977,440 entitled "SUPPORT FOR SHARING COMPUTATION BETWEEN AGGREGATIONS IN A DATA STREAM MANAGEMENT SYSTEM" filed on Oct. 20, 2007 by the inventors of the current patent application.

BACKGROUND

It is well known in the art to process queries over continuous streams of data using one or more computer(s) that may be called a data stream management system (DSMS). Such a system may also be called an event processing system (EPS) or a continuous query (CQ) system, although in the following description of the current patent application, the term "data stream management system" or its abbreviation "DSMS" is used. DSMS systems typically receive from a user a textual representation of a query (called "continuous query") that is to be applied to a stream of data. Data in the stream changes over time, in contrast to static data that is typically found stored in a database. Examples of data streams are: real time stock quotes, real time traffic monitoring on highways, and real time packet monitoring on a computer network such as the Internet.

FIG. 1A illustrates a prior art DSMS built at the Stanford University, in which data streams from network monitoring can be processed, to detect intrusions and generate online performance metrics, in response to queries (called "continuous queries") on the data streams. Note that in such data stream management systems (DSMS), each stream can be infinitely long and the data can keep arriving indefinitely and hence the amount of data is too large to be persisted by a database management system (DBMS) into a database.

As shown in FIG. 1B a prior art DSMS may include a continuous query compiler that receives a continuous query and builds a physical plan which consists of a tree of natively supported operators. Any number of such physical plans (one plan per query) may be combined together, before DSMS starts normal operation, into a global plan that is to be executed. When the DSMS starts execution, the global plan is used by a query execution engine (also called "runtime engine") to identify data from one or more incoming stream(s) that matches a query and based on such identified data the engine generates output data, in a streaming fashion.

As noted above, one such system was built at Stanford University, in a project called the Standford Stream Data Management (STREAM) Project which is documented at the URL obtained by replacing the ? character with "/" and the character with "." in the following: http:??www-db%stanford%edu?stream. For an overview description of such a system, see the article entitled "STREAM: The Stanford Data Stream Management System" by Arvind Arasu, Brian Babcock, Shivnath Babu, John Cieslewicz, Mayur Datar, Keith Ito, Rajeev Motwani, Utkarsh Srivastava, and Jennifer Widom which is to appear in a book on data stream management edited by Garofalakis, Gehrke, and Rastogi. The just-described article is available at the URL obtained by making the above described changes to the following string: http:??dbpubs%stanford%edu?pub?2004-20. This article is incorporated by reference herein in its entirety as background.

For more information on other such systems, see the following articles each of which is incorporated by reference herein in its entirety as background:

[a] S. Chandrasekaran, O. Cooper, A. Deshpande, M. J. Franklin, J. M. Hellerstein, W. Hong, S. Krishnamurthy, S. Madden, V. Ramna, F. Reiss, M. Shah, "TelegraphCQ: Continuous Dataflow Processing for an Uncertain World", Proceedings of CIDR 2003;

[b] J. Chen, D. Dewitt, F. Tian, Y. Wang, "NiagaraCQ: A Scalable Continuous Query System for Internet Databases", PROCEEDINGS OF 2000 ACM SIGMOD, p379-390; and

[c] D. B. Terry, D. Goldberg, D. Nichols, B. Oki, "Continuous queries over append-only databases", PROCEEDINGS OF 1992 ACM SIGMOD, pages 321-330.

Continuous queries (also called "persistent" queries) are typically registered in a data stream management system (DSMS) prior to its operation on data streams. The continuous queries are typically expressed in a declarative language that can be parsed by the DSMS. One such language called "continuous query language" or CQL has been developed at Stanford University primarily based on the database query language SQL, by adding support for real-time features, e.g. adding data stream S as a new data type based on a series of (possibly infinite) time-stamped tuples. Each tuple s belongs to a common schema for entire data stream S and the time t is a non-decreasing sequence. Note that such a data stream can contain 0, 1 or more pairs each having the same (i.e. common) time stamp.

Stanford's CQL supports windows on streams (derived from SQL-99) based on another new data type called "relation", defined as follows. A relation R is an unordered group of tuples at any time instant t which is denoted as R(t). The CQL relation differs from a relation of a standard relational database accessed using SQL, because traditional SQL's relation is simply a set (or bag) of tuples with no notion of time, whereas the CQL relation (or simply "relation") is a time-varying group of tuples (e.g. the current number of vehicles in a given stretch of a particular highway). All stream-to-relation operators in Stanford's CQL are based on the concept of a sliding window over a stream: a window that at any point of time contains a historical snapshot of a finite portion of the stream. Syntactically, sliding window operators are specified in CQL using a window specification language, based on SQL-99.

For more information on Stanford University's CQL, see a paper by A. Arasu, S. Babu, and J. Widom entitled "The CQL Continuous Query Language: Semantic Foundation and Query Execution", published as Technical Report 2003-67 by Stanford University, 2003 (also published in VLDB Journal, Volume 15, Issue 2, June 2006, at Pages 121-142). See also, another paper by A. Arasu, S. Babu, J. Widom, entitled "An Abstract Semantics and Concrete Language for Continuous Queries over Streams and Relations" in 9th Intl Workshop on Database programming languages, pages 1-11, September 2003. The two papers described in this paragraph are incorporated by reference herein in their entirety as background.

An example to illustrate continuous queries is shown in FIGS. 1C-1E which are reproduced from the VLDB Journal paper described in the previous paragraph. Specifically, FIG. 1E illustrates a merged STREAM query plan for two continuous queries, Q1 and Q2 over input streams S1 and S2. Query Q1 of FIG. 1E is shown in detail in FIG. 1C expressed in CQL as a windowed-aggregate query: it maintains the maximum value of S1:A for each distinct value of S1:B over a 50,000-tuple sliding window on stream S1. Query Q2 shown in FIG. 1D is expressed in CQL and used to stream the result of a sliding-window join over streams S1 and S2. The window on S1 is a tuple-based window containing the last 40,000 tuples, while the window on S2 is a 10-minutes time-based window.

Several DSMS of prior art, such as Stanford University's DSMS treat queries as fixed entities and treat event data as an unbounded collection of data elements. This approach has delivered results as they are computed in near real time. However, once queries have registered and such a prior art DSMS begins to process event data, the query plan cannot be changed, in prior art systems known to the current inventors. In one prior art DSMS, even after it begins normal operation by executing a continuous query Q1, it is possible for a human (e.g. network operator) to register an "ad-hoc continuous query" Q2, for example to check on congestion in a network, as described in an article by Shivnath Babu and Jennifer Widom entitled "Continuous Queries over Data Streams" published as SIGMOD Record, September 2001. The just-described paper is incorporated by reference herein in its entirety as background. Such a query Q2 may be written to find a fraction of traffic on a backbone link that is coming from a customer network.

Unlike a research DSMS of the kind described above, a DSMS for use in processing real world time-varying data streams is limited if it only allows queries to use built-in (i.e. native) aggregations, such as SUM, COUNT, AVG. There appears to be a long felt and unsolved need for real-time support of aggregations (also called aggregation functions) that may be defined by the user.

SUMMARY

A computer is programmed in accordance with the invention to implement a data stream management system (DSMS) to accept a command for creation of a new aggregation defined by a user during normal operation of the DSMS, and thereafter accept and process new continuous queries using the new aggregation, in a manner similar to built-in aggregations. The user typically writes a set of instructions to perform the new aggregation, compiles them (if appropriate) and identifies in the command, a location of the set of instructions. In response to such a command, the computer creates metadata identifying the new aggregation, in a metadata repository.

The metadata is used in many embodiments, to process a new continuous query that uses the new aggregation as follows. Specifically, on receipt of such a new continuous query, the computer creates an operator to execute the new query, using an opcode designed to invoke performance of aggregation(s). This newly-created operator includes one or more structure(s) to hold one or more paths to one or more instances of the set of instructions written by the user.

Depending on the embodiment, the just-described instances are not instantiated at query compilation time, i.e. when the operator is created. The new aggregation's instantiation is performed during query execution, i.e. while the newly-created operator is itself being executed. The set of instructions used to instantiate the instance are identified by the operator looking up the metadata that was created during query compilation. Depending on the aggregation's grouping of data, by an attribute of the data, the computer creates multiple instances of the set of instructions. Each instance holds state information which is specific to a corresponding value of the attribute.

Moreover, in a certain embodiments, each instance is created and deleted by the computer, in a just-in-time manner, as and when a window containing data to be processed by the instance becomes non-empty and empty respectively. Specifically a count is maintained for each set of values of the attribute. When the count is incremented from an initial value (e.g. zero), a corresponding instance is created and when the count is decremented to return to the initial value the instance is deleted and its memory released. When the existing set of values for a group is changed, the existing instance is re-initialized and a user-written method is invoked on all the underlying values (either one at a time or all at once as a set). Hence, in these embodiments, receipt of data from a stream may cause the operator to automatically create an instance, based on the set of instructions provided by the user, followed by execution of the instructions within the instance to process the data, thereby to implement support for a user-defined aggregation function.

In the certain embodiments, additional operators are not created on receipt of additional continuous queries for each use of the new aggregation. Instead, in these embodiments, an existing operator is simply re-used for each new query, by using the outputs of the existing operator to execute the new query.

BRIEF DESCRIPTION OF THE DRAWINGS

FIG. 2C illustrates, an example of a tree of operators with one operator containing a user-defined aggregation function, in accordance with the invention.

FIG. 3A illustrates, in flow charts, methods that are executed by the extended DSMS of FIG. 2A, in some embodiments of the invention to obtain (and use) a modified plan by addition of new continuous queries that use UDAs.

FIG. 3B illustrates, in a block diagram, a metadata structure created by the method of FIG. 2A to map an aggregation name to a location of the set of instructions to be performed for the aggregation.

FIG. 4 illustrates, in a block diagram, a structure created within an aggregation operator by some embodiments of the method of FIG. 3A for use in executing the continuous query based on a user defined aggregation.

FIG. 6 illustrates, in a high level block diagram, hardware included in a computer that may be used to perform the methods of FIGS. 3A and 5 in some embodiments of the invention.

DETAILED DESCRIPTION

Figure 1A:
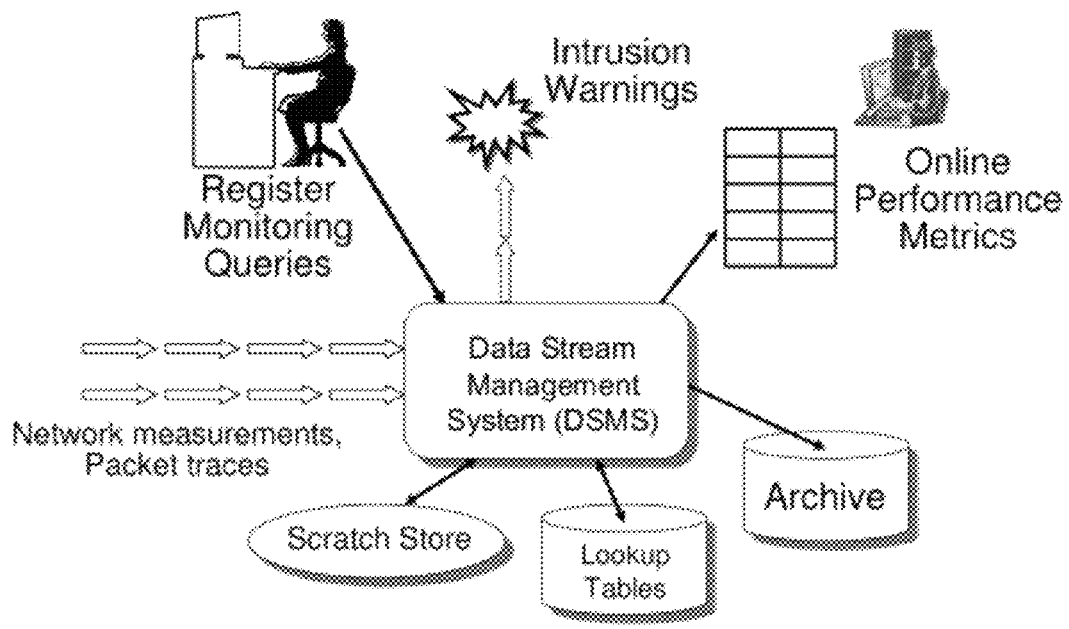
FIGS. 1A and 1B illustrate, in a high level diagram and an intermediate level diagram respectively, a data stream management system of the prior art.
Figure 1B:
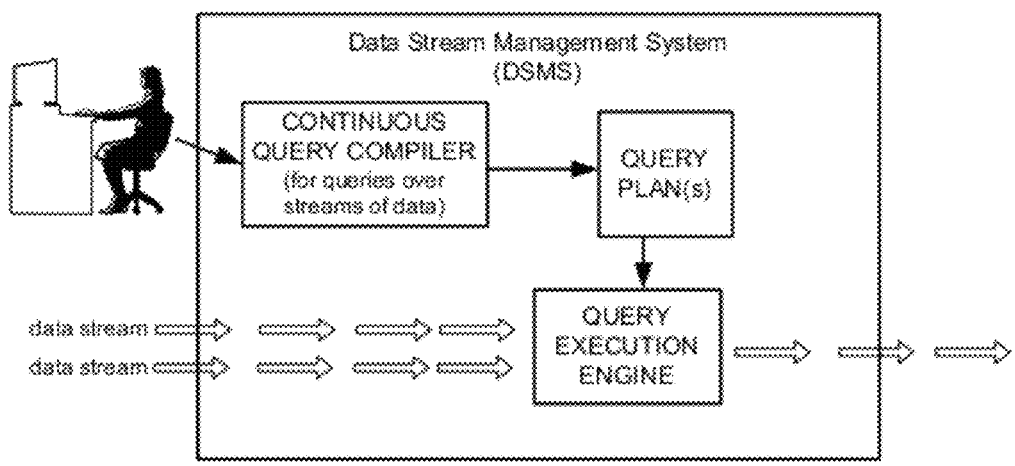
Figures 1C, 1D, 1E:
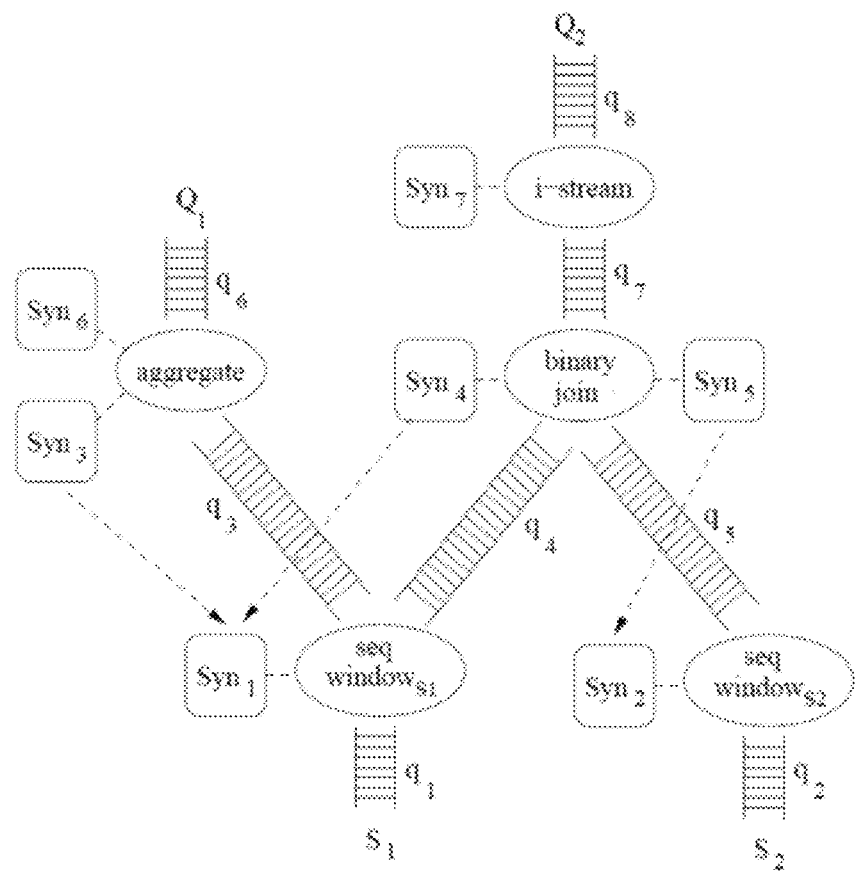
FIGS. 1C and 1D illustrate two queries expressed in a continuous query language (CQL) of the prior art.
FIG. 1E illustrates a query plan of the prior art for the two continuous queries of FIGS. 1C and 1D.

Many embodiments of the invention use a DSMS whose continuous query language (CQL) natively supports certain standard SQL keywords, such as a SELECT command having a FROM clause and in addition also supports windowing functions required for stream and/or relation operations. Note that even though several keywords and/or syntax may be used identically in both SQL and CQL, the semantics are different for these two languages because SQL may be used to define queries on stored data in a database whereas CQL is used to define queries on transient data in a data stream that changes over time.

A computer which implements a DSMS in accordance with the invention is programmed with certain software in several embodiments called an aggregation definition module and a continuous query compiler, as discussed below in reference to FIG. 2A. Any aspects of the computer which are not described below are similar or identical to a computer described in the published literature about the Stanford Stream Data Management (STREAM) Project, as discussed in the Background section above. An aggregation definition module is implemented in accordance with the invention to receive and dynamically act on a command to create a new aggregation which is to be recognized in new continuous queries that are received thereafter, and executed in a manner similar or identical to built-in aggregations for data streams such as MAX. For example, the user may define secondMax as their user defined aggregation, to find and return the second largest number, assuming this is not a built-in aggregation of the DSMS.

Of note, the aggregation definition module is designed to accept such creation command(s) on the fly, i.e. during normal operation of the DSMS on existing queries. Moreover, a continuous query compiler is implemented in accordance with the invention to receive and act on a new continuous query q that uses a user defined aggregation a, also on the fly during normal operation of the DSMS on existing queries. Accordingly, such a DSMS in accordance with the invention is hereinafter referred to as an extended DSMS.

Extended DSMS 200 (FIG. 2A) includes a compiler or interpreter for a predetermined non-database language, also called procedural language, in which the user writes a set of instructions to be performed by extended DSMS 200 in response to a user defined aggregation a. Specifically, a user writes a set of instructions 201 for aggregation a in the predetermined language, such as Java and having a predetermined name as specified in an interface definition. An example of a public interface supported by extended DSMS 200 of some embodiments is illustrated in Subsection A below.

The user stores the set of instructions 201 in store 280 within extended DSMS 200 (via line 242) during normal operation of DSMS 200, i.e. while a number of queries (also called existing queries) are being currently processed. Additionally the user also issues a command 202 to extended DSMS 200 (via line 242), to create user defined aggregation a. In response to command 202, extended DSMS 200 dynamically stores command 202 (while continuing to process queries in the normal manner), for use in validating new queries.

Figure 2A:
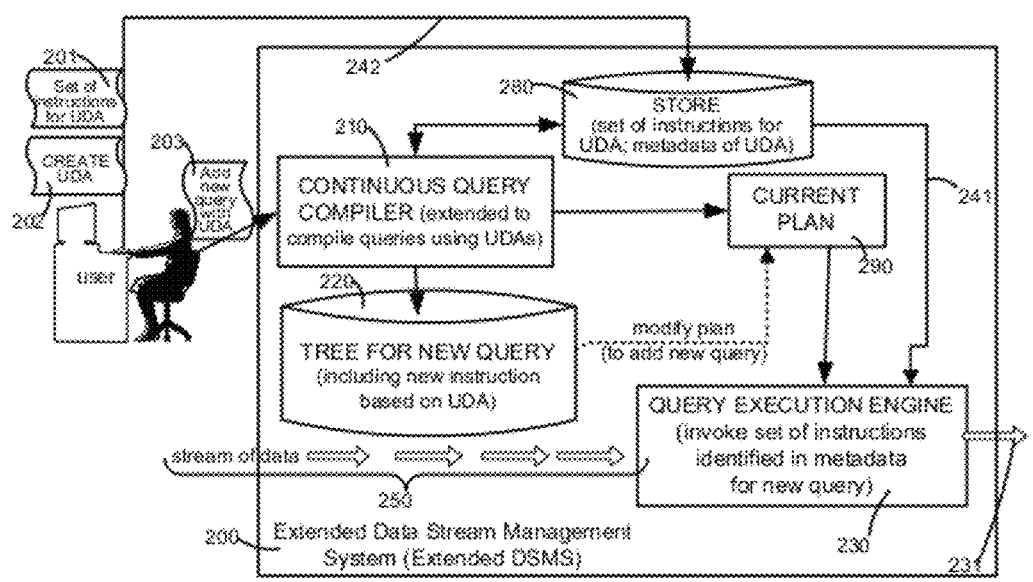
FIG. 2A illustrates, in an intermediate level diagram, a data stream management system (DSMS) that has been extended in accordance with the invention to support user defined aggregations (UDAs).
Figure 2B:
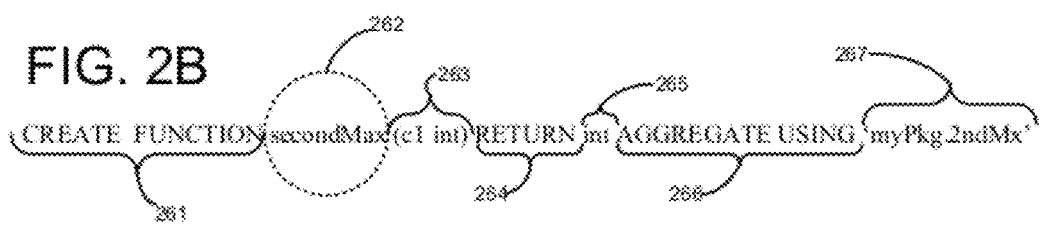
FIG. 2B illustrates a command to define a UDA that is accepted by the extended DSMS of FIG. 2A.

An illustration of command 202 is shown in FIG. 2B. Command 202 is typically typed by a user as a string of characters which starts with one or more reserved word(s) 261 (FIG. 2B) such as CREATE FUNCTION. Alternative embodiments may use other words or use more than two words. In many embodiments, the syntax for the CREATE FUNCTION statement in CQL as described herein conforms to the syntax of SQL (as used in prior art DBMS, such as Oracle 10gR1).

The command 202 also has a number of arguments which follow keyword(s) 261, such as aggregation's name 262 and argument list 263. Aggregation name 262 is illustrated in FIG. 2B to have the value secondMax. This value is chosen by the user as the aggregation name to be used in continuous queries, to invoke the set of instructions 201. Argument list 263 is a listing of the aggregation's arguments surrounded by brackets. Argument list 263 is illustrated in FIG. 2B to consist of one argument, namely integer, which is the data type of an input to the set of instructions 201. Note, however, that list 263 may contain multiple arguments, depending on the embodiment.

Moreover, command 202 has one or more clauses, introduced by reserved words which may be optionally followed by arguments. Command 202 has two clauses starting with reserved word 264 and reserved words 266 respectively followed by argument 265 and 267 respectively. The value of reserved word 264 is shown in FIG. 2B as RETURN and its argument 265 identifies the data type of the value to be returned by the aggregation. The reserved words 266 have the value "AGGREGATE USING" and their argument 267 identifies a user-written Java class named "2ndMx" that is implemented in the package "myPkg".

As will be apparent to the skilled artisan, other embodiments may have other clauses, reserved words, arguments and values thereof. Moreover, the order of various portions of command 202, relative to one another, can be different depending on the embodiment. However, note that in order for extended DSMS 200 to find a Java class when instantiating function f1, the user must place their package "myPkg" in an appropriate location in the file system that is reachable via a path normally used by extended DSMS 200 to load and execute Java classes. Accordingly, if a path is appropriately set up and known to the user, extended DSMS 200 can receive the user's software (set of instructions 201) via such a path at any time relative to normal operations (i.e. the extended DSMS can be up and running and processing existing continuous queries).

The user-written Java class 2ndMx within package myPkg must contain (1) a factory method of a predetermined name, to instantiate the user-defined aggregation, (2) a release method, also of a predetermined name, to release the memory occupied by an instantiated aggregation (i.e. an instance), and (3) the aggregation itself which includes (a) an initialize function to reset state variables and related memory, in an instance of the aggregation; and (b) one or more versions of a handle function (also called "method") which is to process (i.e. handle) each tuple. In some embodiments, the handle function is designed to return an intermediate result of aggregation done so far in response to each tuple, which intermediate result is ignored, until the last tuple is processed (from a last message) at which point a final result is returned.

An example of a query that uses a user-defined aggregation is as follows. The user has registered the following query (after defining "secondMax" as a user-defined aggregation):

Q1: Select C1, secondMax(C2) from S[range 10] group by C1

Accordingly, this query is automatically compiled as shown in FIG. 2C, and it includes a group by operator 251 (which is one example of a DSMS operator) that is internally implemented to invoke the user-defined aggregation function secondMax. When Q1's execution is started at time 100, an output stream (e.g. included in stream 231 of FIG. 2A) for values of O1 at each of several time instants, 100, 101, . . . 500 gets generated (assuming current time is 500).

As shown in FIG. 3A, an aggregation definition module in extended DSMS 200 receives a command to create a user defined aggregation (UDA) in act 311 and proceeds to act 312. In act 312, the command is parsed and validated, followed by act 313. In act 313, extended DSMS 200 stores one or more pieces of information about aggregation a (called "metadata") that were received in command 202, for later use when a query 203 is received. Aggregation a's metadata may include one or more of pieces of information 263, 265 and 267 illustrated in FIG. 2B and described above. More specifically, in the embodiment shown in FIG. 3A, in act 313, extended DSMS 200 (a) instantiates a factory method of the predetermined name described above (in the paragraph describing user-written Java class 2ndMx); and (b) maps the user-defined aggregation function's name (or the function's identifier that is uniquely assigned by extended DSMS 200) to the instance created by the just-described act (a).

In some embodiments, metadata on aggregation a is stored in store 280 in an arrangement similar or identical to storage of the corresponding information for a built-in aggregation. On performance of act 313, an expression evaluator in DSMS 200 is automatically reconfigured to use an aggregation evaluator that in turn uses the aggregation a's metadata to henceforth recognize the user defined aggregation a as valid, and to invoke the set of instructions 201 for aggregation a. Extended DSMS 200 performs one or more acts depending on the embodiment, to store metadata of aggregation a in store 280. Aggregation a's metadata forms a single entry among a number of metadata entries for UDAs in store 280 that are accessible to query compiler 210 in DSMS 200.

An illustration of aggregation a's metadata entry in store 280 in some embodiments is shown in FIG. 3B. The metadata entry typically includes a name 381 of the user-defined aggregation function a and a reference 382 to the set of instructions for the function a. In some embodiments, a reference 382 is a copy of information piece 267 which is extracted from command 202. In some embodiments, an aggregation's metadata entry also holds information useful in checking data types in a query's usage of aggregation a during query compilation, such as the number of arguments and the data type of each argument. This is illustrated in FIG. 3B by the number 383 of arguments that are input to the aggregation a, a list 384 of argument names, a list 385 of data types of these arguments, and a data type 386 of the return value for this aggregation.

The embodiment of metadata entry illustrated in FIG. 3B can have any number N of argument names 384A-384N, with a corresponding number N of data types, and the number N is stored in field 383 of the metadata entry. As will be apparent to the skilled artisan, other embodiments may maintain the information in such a metadata entry in a different order, or even maintain other information that is useful in compilation of a new continuous query based on user defined aggregation a. Note that alternative embodiments may maintain data type checking information in a location other than the metadata entry.

In some embodiments of the kind illustrated in Subsection A below, in act 313 the computer automatically instantiates using reflection a factory method of a predetermined name "IaggrFnFactory" from the package provided by the user, e.g. myPkg. At this time, the computer has not yet created an instance of the aggregation method "IaggrFunction" which is also included in the user's package (e.g. set of instructions 201 in FIG. 2A); instead the computer has an instance of the factory method, which contains a path to reach the aggregation method.

After command 202 is processed by aggregation definition module 310, the user may now issue a new continuous query 203 which uses the user defined aggregation a. In some embodiments, continuous query 203 is expressed in continuous query language CQL of the kind described in the background section above. Query 203 may include a reference to the new user defined aggregation a only in certain places therein. In some embodiments, an aggregation a can be included in a select list of a query q, but not in the wherein clause of the query. In certain embodiments, the aggregation a cannot be included in any expression. Also, depending on the embodiment, aggregation a may be invoked with arguments which are themselves expressions of any data from a tuple currently being processed. In several embodiments, such a query may use any number of user defined aggregations and/or built-in aggregations, although they cannot be nested relative to one another.

Extended DSMS 200 receives continuous query 203 as per act 321 and parses the query (FIG. 3A) and thereafter semantically validates the query as per act 322. Next, a logical plan is created in act 323, followed by a physical plan in act 324, followed by an execution plan in act 325, followed by act 326 which modifies a query execution plan that is currently in use. In act 324 (FIG. 3A), a continuous query compiler 210 within extended DSMS 200 uses the aggregation a's metadata on encountering the use of aggregation a in a physical operator of the physical plan, to invoke the user-defined aggregation function. Continuous query compiler 210 (FIG. 2A) typically includes logic (such as a parser) to identify use of functions in continuous queries. Accordingly, query compiler 210 creates a tree 220 for the new query, including an operator (also called "aggregation" operator or "groupby" operator) containing a predetermined opcode (such as UDA-INT) to invoke user defined aggregations with an integer input, and one or more data structure(s) to hold information specific to each aggregation.

At this stage, if the query specifies a given aggregation multiple times, then a single data structure for the given aggregation is used in the aggregation operator, and the same output is mapped to the multiple occurrences in the query. Accordingly, the same data is returned multiple times, if a query so requires. If the query specifies multiple aggregations that are different from one another (e.g. secondMax, MAX, AVG), then all such aggregations are placed in a list which is included in the aggregation operator. The query compiler 210 also includes in the list one or more native aggregation operators (e.g. SUM) needed to implement another aggregation specified in the query (e.g. AVG). After creation of such an aggregation operator, query compiler 210 uses the tree to modify the currently executing plan, which concludes act 322. After act 325, an act 326 (FIG. 3A) is performed wherein query compiler 210 alters the processing of queries, by invoking a scheduler to allocate time slots for all operators including the newly added operator, thereby to cause the new continuous query q to be automatically executed by query execution engine 230 in addition to existing queries. Data resulting from such execution is included in a stream 231 that is output by extended DSMS 200.

As shown in FIG. 3A, at an appropriate time, query execution engine 230 awakens the newly added operator in act 331 and then goes to act 332. In act 332, engine 230 checks if a new tuple of data has been received. If not, then engine 230 goes to sleep as per act 336, to be eventually awakened in the next time slot (as shown by act 337). In act 332, if a new tuple has been received, engine 230 performs various acts in the normal manner, and eventually goes to act 333 to check if an aggregation is to be evaluated. If so, then control transfers to act 334 wherein an aggregation evaluator invokes the specified aggregation function's instance, to execute the instructions within the user defined aggregation a with user-specified argument(s) from the new tuple, followed by release. In act 334, the engine 230 executes the set of instructions 201, which are identified from information in the opcode-specific data structure. In some embodiments of act 334, execution engine 230 instantiates the set of instructions 201, as many times as the number of groups of data in the data streams, as discussed below. After act 334, engine 230 goes to act 335 to perform specific functions of the DSMS operator, such as the group by function, followed by going to sleep as per act 336.

In some embodiments, the same identifier (e.g. from reference 382) is repeatedly used in act 333 in instantiating the set of instructions 201 for multiple data groups required by user defined aggregation a. The identifier is obtained in act 333 by looking up the aggregation's metadata entry in store 280, using the aggregation's name as an index. Such an identifier may be copied into an opcode-specific data structure by compiler 210 and thereafter used by engine 230 in expression evaluation as per act 333. Note that there are as many instances in the new operator as there are groups of data, in certain embodiments. For example, data may be grouped by tickerID, in a stream of stock quotes, and the secondMax price for a given stock (e.g. tickerID ORCL) can be determined by aggregation. In certain embodiments, there are as many groups (and instances) as there are tickerIDs in a given time interval. Hence, if in the time interval, all trades were only for ten stocks then there are ten groups (and accordingly ten instances of the set of instructions 201).

Note that the above-described metadata entry of the aggregation is used to process the new tuple, e.g. to prepare input argument(s) for the UDA (e.g. set of instructions 201), and to identify an appropriate version of the UDA to be used based on the data type of one or more argument(s). The input arguments are normally passed in to the UDA as an array of objects (such as an array of integers, real numbers etc). Such transfer uses a mapping of data types between (1) data types in a predetermined language in which user's aggregation is expressed (e.g. Java), and (2) data types in extended DSMS 200, as illustrated in Subsection A below. Also, note that query receipt, compilation and execution are performed by some embodiments of extended DSMS 200 (FIG. 2) while processing incoming streams of data 250 by executing thereon one or more continuous queries that were already being executed ("existing queries") prior to receipt of the new continuous query q.

Some embodiments of extended DSMS 200 use an opcode-specific data structure of the kind illustrated in FIG. 4. Specifically, such a data structure includes the following fields: a first field 451 holds a pointer to the set of instructions, a second field 452 holds the number of arguments, a third field 453 holds the data type of the value to be returned by the user defined aggregation. The data structure also includes a number of fourth fields 454A-454N, which are equal in number to the value in second field 452. The just-described opcode-specific data structure is used in some embodiments by an aggregation evaluator of the kind illustrated in FIG. 5, as discussed next.

In response to receipt of a new event in act 501, an aggregation evaluator of some embodiments performs act 502 to determine the value of a GROUPBY attribute, if the data is being grouped by the query q. If the data is being grouped, typically an index is used on an output store of the operator, and index keys thereof form the values of the attribute. In the above-described example, tickedID is the attribute and ORCL is the value. Next, in act 503, the aggregation evaluator determines if an aggregation exists for the value determined in act 502 and if yes, control transfers to act 505. If the answer is no in act 503, then act 504 is performed.

In act 504, an aggregation context is allocated as follows: a count is initialized to 0 and an instance of the user-defined aggregation function is created by invoking factory, and initializing a pointer to the aggregation function, to point to the instance that has just been created. Specifically, the aggregation evaluator invokes the factory method for the UDA by beginning execution of the in-memory instance of the set of instructions 201 (e.g. see "IAggrFnFactory" in Subsection A below). The factory method may select an appropriate one of several versions of the UDA, based on the data type(s) of one or more argument(s). For example, an integer input and integer output version of the UDA may be selected, if the input data from the current tuple is integer. When the factory method completes, an instance of the UDA (e.g. "IAggrFunction") is present in memory, ready for use. On conclusion of act 504, control transfers directly to act 506 where the count is incremented followed by act 507.

Note that instance creation is skipped if the instance (for the current tuple's attribute value) is already created as per the 'yes' branch out of act 503 which transfers control to act 505. In act 505, the aggregation evaluator checks if a type of message that is being processed is plus and if so goes to act 506 to increment count and otherwise if minus goes to act 511 to decrement count. A value of the message type is identified in a message (also called element) which includes, in addition to the tuple, a type and a timestamp. Plus messages are received when tuples enter a window and minus messages are received when the tuples exit the window.

After acts 506 and 511, the corresponding acts 507 and 512 are performed to either insert or delete the current message from the input store. Next, control transfers from act 507 to 508 and similarly from act 512 to 513 (depending on the type of message). In act 508, the aggregation evaluator initializes the instance of the user-defined aggregation function (either pre-existing or newly-created), as determined in act 502. In act 513, the aggregation evaluator checks to see if the count is zero and if not, goes to act 508 (just described). After act 508, control transfers to act 509 that invokes a specific instance to perform a predetermined method in the user-defined aggregation multiple times, once for each message in the input store as illustrated by a looping branch 509A. The specific instance which is invoked depends on the current value of the group by attribute. Note that logically, the DSMS operator maintains one input store for each unique value of the group by attribute and the set of messages are automatically selected based on that value.

More specifically, in some embodiments of act 510, the aggregation evaluator invokes a predetermined method (e.g. "handlePlusInt(int)") in the instance of the user-defined aggregation function (e.g. "IAggrFunction" in Subsection A below). The version of predetermined method that is invoked in act 509 depends on the data types of input and output to and from the method. Specifically, in certain embodiments there are two versions of predetermined methods, one for each of the two possibilities of (integer and float) as follows:

handlePlusInt(int)
handlePlusFloat(float)

Note that since the user knows which datatypes to expect, he/she needs to write the corresponding "plus" functions only for the datatypes supported. Note further that a "minus" function is not used in act 509 even if a "minus" message is received. Instead, as noted above in reference to act 512, a message in the input store which corresponds to the "minus" message is deleted from the input store, and hence on entry to act 509 the set of messages in the input store is a complete set at the current time, over which a scan is performed via branch 509A. Hence, there is no need for a user to write handleMinusInt(int) and handleMinsFloat(float) when the DSMS operator performs aggregation evaluation as per FIG. 5. Although a looping branch 509A is shown explicitly in FIG. 5, some embodiments of the invention use a wrapper around act 509 including branch 509A, and in such embodiments a pointer to the input store is directly supplied to the "plus" method written by the user which in turn performs the looping by branch 509A.

In some embodiments, the predetermined method receives and operates on a set of tuples as a whole, to perform the aggregation. In these embodiments, the DSMS operator maintains the entire set of tuples (e.g. within a range window) as described above in reference to act 507, and hence in act 509 that entire set is passed to the predetermined method each time that a message is received. In other embodiments, the predetermined method is designed (by the user) to operate incrementally, one tuple at a time, and is therefore invoked once per message in act 509.

In one illustrative example, there are K messages in an input store of a DSMS operator which uses a user-defined aggregation and the DSMS operator calls the handle K times in total, and in doing so when calling the handle for the first (K−1) times with the respective (K−1) tuples, the (K−1) results being returned are ignored, and then the DSMS operator calls the handle one last time with the last tuple, and uses that final result as the value of the user-defined aggregation function across the K tuples. Accordingly, the handle (in the user-defined aggregation) maintains state information internally, sufficient to compute a result of a next iteration, when the handle is next called. For example, if the aggregation is average, the handle maintains internally, two state variables namely: (a) the number of tuples and (b) the sum of tuples, which are together sufficient to compute an average on the next iteration (by adding the next tuple's value to the sum and dividing by an incremented number of tuples). A set of instructions 201 representing such software is illustrated below, in Subsection B.

Next, in act 510, the aggregation evaluator returns a single result which is obtained from the predetermined function in act 509. Thereafter, the aggregation evaluator continues with processing of the expression in the continuous query, in the normal manner. In act 513, if count is zero, which happens when the number of tuples in the window is zero, then the aggregation evaluator performs act 514 which invokes the release function in the factory method, which in turn deletes the aggregation context (including the function instance), thereby to release memory. After acts 510 and 514, the aggregation evaluator uses the result to evaluate the rest of the aggregation, and the execution engine continues with processing the query in the normal manner.

An example of a stream of stock ticker prices is now described to further illustrate the operation of an exemplary embodiment of the invention. In this example, DSMS 200 contains a source of the data stream TradeStream, with each message in the stream containing at least the value of a tickerSymbol and the value of its tradeVolume. In this example, the user has created the user-defined aggregation secondMax and may then issue the following query:

Q2: Select secondMax(tradeVolume), tickerSymbol
    from TradeStream[range 1 hour]
    group by tickerSymbol To execute Q2 in the above example, DSMS 200 initially creates one instance of the IAggrFunction for each unique value of the tickerSymbol as messages arrive in TradeStream. For example if the first message received at time 0 has tickerSymbol of value GOOG then an instance of IAggrFunction is created (in act 504 in FIG. 5), which in turn instantiates the function secondMax and stores a pointer to it (also in act 504). Next, count is incremented in act 506 to 1, followed by inserting the message into input store. The newly-created function instance of secondMax is then initialized in act 508 followed by invoking that instance only once in act 509 (for the single message received at time 0) followed by copying the result in act 510.

In the example, at time 20 a second message also of tickerSymbol value GOOG is received. As it is within one hour of the first message, it belongs to the same set as the first message. In processing this second message, the act 504 is skipped and instead control transfers to 506 wherein count is incremented to 2, followed by insertion of the second message into input store, followed by initializing (in act 508) the instance of secondMax that was previously instantiated in act 504 for the value GOOG followed by invoking that instance twice in act 509 (via looping branch 509A), one for each of the two messages in the input store, namely the message received at time 0 and the message received at time 20. Act 509 is followed by copying the result in act 510.

In the example, a third message is received at time 30 tickerSymbol value ORCL, it is within the same range window (of 1 hour), and is therefore inserted into the same input store, but a new instance of IAggrFunction is created in act 504 which in turn instantiates a new instance of secondMax for use with this new tickerSymbol value ORCL, followed by initializing in act 508 followed by invoking that instance only once in act 509 (looping branch 509A is not used) because there is only one message in the input store with tickerSymbol value ORCL. Act 509 is followed by copying the result in act 510.

One hour after receipt of the first message, i.e. at time 60 the first message leaves the range window, and hence a "minus" type message is received for tickerSymbol value GOOG, and count is decremented in act 511, and the first message is deleted from the input store, and since count is not 0 in act 513, the previously-instantiated secondMax function is initialized and invoked in act 509 only once (again looping branch 509A is not used) because at this stage there is only one message in the input store with tickerSymbol value GOOG. Note that in act 509 the instance being invoked is unique to tickerSymbol value GOOG. Act 509 is followed by copying the result in act 510.

One hour after the second message is received, i.e. at time 80, the second message also leaves the range window, and hence another "minus" type message is received for tickerSymbol value GOOG, and this time when count is decremented in act 511, the count value falls to 0, and so act 514 is performed to release the aggregation context which was originally allocated in act 504 when the first message for tickerSymbol value GOOG was received at time 0. Act 514 is followed by copying the result in act 510.

Note that in some embodiments, writing of a user-defined aggregation function (such as secondMax which maintains an internal store, see Subsection B below) to generate an aggregation value in response to a single message, without access to an entire set of values over which aggregation is being performed is more efficient. Hence, in certain cases (e.g. such as average, see Subsection C below), the user-defined aggregation is explicitly written to not require an entire set of values over which aggregation is to be performed, in response to each message, as described in the related U.S. application Ser. No. 11/977,437 entitled "SUPPORT FOR INCREMENTALLY PROCESSING USER DEFINED AGGREGATIONS IN A DATA STREAM MANAGEMENT SYSTEM" and incorporated by reference above.

Note that the extended data stream management system 200 may be implemented in some embodiments by use of a computer (e.g. an IBM PC) or workstation (e.g. Sun Ultra 20) that is programmed with an application server, of the kind available from Oracle Corporation of Redwood Shores, Calif. Such a computer can be implemented by use of hardware that forms a computer system 600 as illustrated in FIG. 6. Specifically, computer system 600 includes a bus 602 (FIG. 6) or other communication mechanism for communicating information, and a processor 604 coupled with bus 602 for processing information.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying to a computer user, any information related to DSMS 200 such as a data stream 231 that is being output by computer system 600. An example of data stream 231 is a continuous display of stock quotes, e.g. in a horizontal stripe at the bottom of display 612. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

As described elsewhere herein, incrementing of multi-session counters, shared compilation for multiple sessions, and execution of compiled code from shared memory are performed by computer system 600 in response to processor 604 executing instructions programmed to perform the above-described acts and contained in main memory 606. Such instructions may be read into main memory 606 from another non-transitory computer-readable storage medium, such as storage device 610. Execution of instructions contained in main memory 606 causes processor 604 to perform the process steps described herein. In alternative embodiments, hard-wired circuitry may be used in place of or in combination with software instructions to implement an embodiment of the kind illustrated in FIGS. 3A and 5. Thus, embodiments of the invention are not limited to any specific combination of hardware circuitry and software.

The term "computer-readable medium" as used herein refers to any non-transitory storage medium that participates in storing instructions for supply to processor 604 for execution. Such a non-transitory storage medium may take many forms, including but not limited to, non-volatile storage media, and volatile storage media. Non-volatile storage media includes, for example, optical or magnetic disks, such as storage device 610. Volatile storage media includes dynamic memory, such as main memory 606.

Common forms of non-transitory computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other non-transitory medium on which information can be stored and from which a computer can read.

Figure 5:
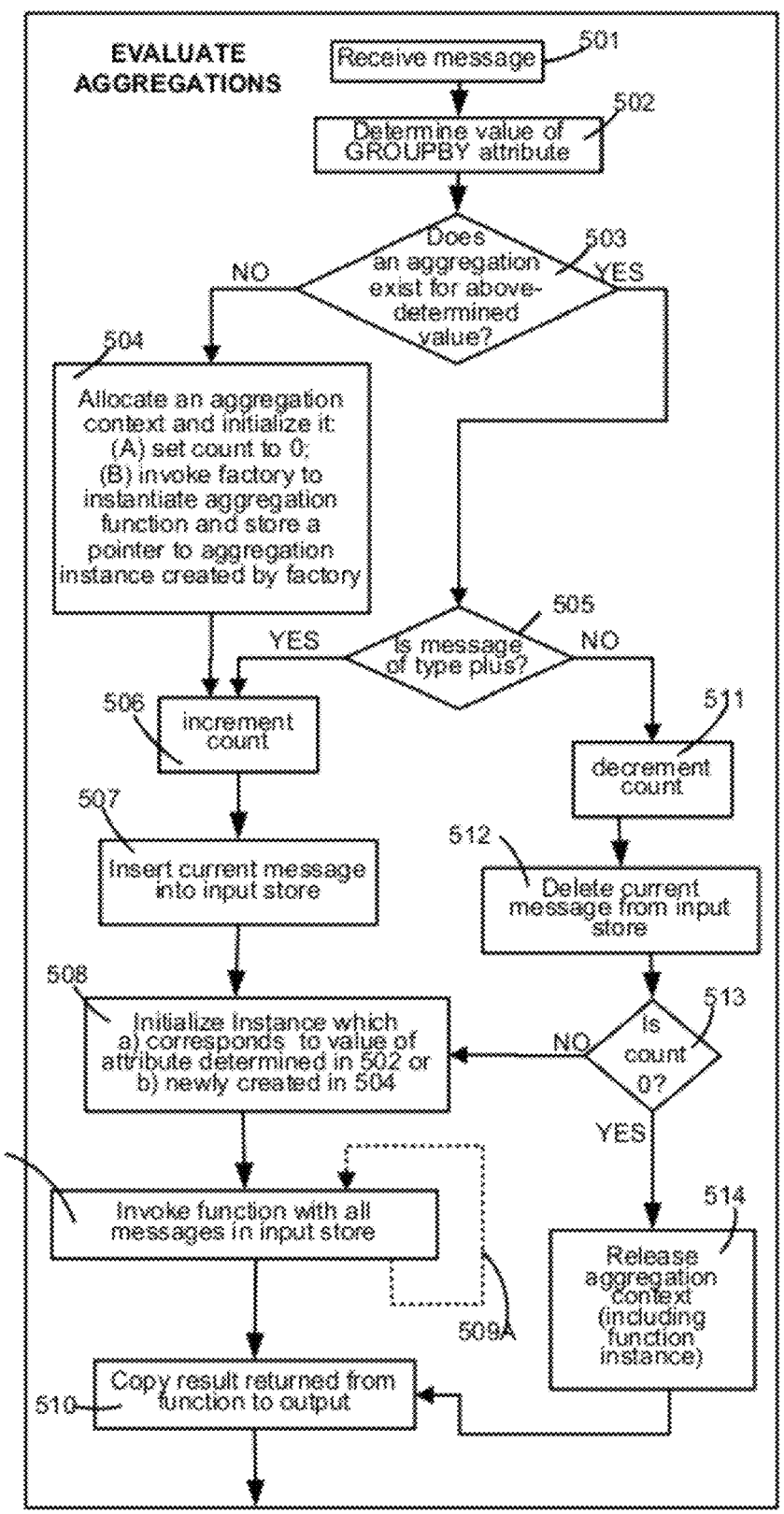
FIG. 5 illustrates, in another flow chart, a method performed by the extended DSMS of FIG. 2A, in some embodiments of the invention, to execute the continuous query compiled as per the method of FIG. 3A.

Various forms of non-transitory computer-readable storage media may be involved in carrying the above-described instructions to processor 604 to implement an embodiment of the kind illustrated in FIG. 5. For example, such instructions may initially be carried on a magnetic disk of a remote computer. The remote computer can load such instructions into its dynamic memory and send the instructions over a telephone line using a modem. A modem local to computer system 600 can receive such instructions on the telephone line and use an infra-red transmitter to convert the received instructions to an infra-red signal. An infra-red detector can receive the instructions carried in the infra-red signal and appropriate circuitry can place the instructions on bus 602. Bus 602 carries the instructions to main memory 606, in which processor 604 executes the instructions contained therein. The instructions held in main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. Local network 622 may interconnect multiple computers (as described above). For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Transmission media includes coaxial cables, copper wire and fiber optics, including the wires that comprise bus 602. Transmission media can also take the form of acoustic or light waves, such as those generated during radio-wave and infra-red data communications.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network 628 now commonly referred to as the "Internet". Local network 622 and network 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 530 might transmit a code bundle through Internet 628, ISP 626, local network 622 and communication interface 618. In accordance with the invention, one such downloaded software implements an embodiment of the kind illustrated in FIGS. 3A and 5. The received software may be executed by processor 604 as received, and/or stored in storage device 610, or other non-volatile storage for later execution. In this manner, computer system 600 may obtain the software in the form of a carrier wave.

Other than changes of the type described above, the data stream management system (DSMS) of several embodiments of the current invention operates in a manner similar or identical to Stanford University's DSMS. Hence, the relation operator in such a computer propagates any new tuples that have a new time stamp to all query operators coupled thereto, including the newly coupled query operator. In this manner, a computer that is programmed in accordance with the invention to receive and execute new continuous queries while continuing to operate on existing continuous queries, without prior art issues that otherwise arise from updating relation operators during modification of an executing plan.

Numerous modifications and adaptations of the embodiments described herein will be apparent to the skilled artisan in view of this current disclosure. Accordingly numerous such modifications and adaptations are encompassed by the attached claims.

Following Subsections A, B and C are integral portions of the current patent application and are incorporated by reference herein in their entirety. Subsection A describes an interface for use by a user defined aggregation in one illustrative embodiment in accordance with the invention. Subsections B and C provide two illustrations of examples of the user defined aggregation using the interface of Subsection A.

Subsection A

The user-defined aggregation needs to implement the following interface:

```
public interface IAggrFnFactory {
    /**
     * Factory method for creating a stateful handler for the
     * corresponding aggregate function
     * @return a new handler corresponding to the aggregate function
     */
    public IAggrFunction newAggrFunctionHandler( ) throws
    UDAException;
    /**
     * Release an already instantiated handler
     * @param handler the already instantiated aggregate function
     handler
     */
    public void freeAggrFunctionHandler(IAggrFunction handler) throws
    UDAException;
}
where IAggrFunction is as follows::
public interface IAggrFunction {
    /**
     * Method to initialize the context for a fresh round of aggregate
     * computation
```

-continued

```
     */
    public void initialize( ) throws UDAException;
    /**
     * Method to handle the next element of the group. The input type
     * is an array of Objects and the return type is an Object
     * Object can be either of INT, FLOAT, BIGINT, CHAR,
     TIMESTAMP
     * @param args input value
     * @param result of the aggregation function so far
     */
    public void handlePlus(Object[ ] args, Object result) throws
    UDAException;
}
```

Subsection B

The code for secondMax TkUsrSecondMax is as follows:

```
public class TkUsrSecondMax implements IAggrFnFactory,
IAggrFunction {
    int    max;
    int    secondMax;
    int    numInputs;
    public IAggrFunction newAggrFunctionHandler( ) throws
    UDAException {
        return new TkUsrSecondMax( );
    }
    public void freeAggrFunctionHandler(IAggrFunction handler) throws
    UDAException {
    }
    public void initialize( ) throws UDAException {
        max        = 0;
        secondMax = 0;
        numInputs = 0;
    }
    public void handlePlus(Object[ ] args, Object res) throws
    UDAException {
        if (args[0] == null) throw ERROR;
        int v = ((Integer)args[0]).intValue( );
        AggrInteger result = (AggrInteger)res;
        numInputs++;
        if (numInputs == 1 ) {
            max        = v;
            result.setNull(true);
            return;
        }
        else if (numInputs == 2) {
            if (v > max) {
                secondMax = max;
                max        = v;
            }
            else
                secondMax = v;
        }
        else {
            if (v > max) {
                secondMax = max;
                max = v;
            }
            else if (v > secondMax)
                secondMax = v;
        }
        result.setValue(secondMax);
    }
}
```

Subsection C (of Detailed Description)

```
public class TkUsrAvg implements IAggrFnFactory,
    IAggrFunction {
        int      total;
        int      numInputs;
        public IAggrFunction newAggrFunctionHandler( ) throws
```

```
        UDAException {
                return new TkUsrAvg( );
        }
        public void freeAggrFunctionHandler(IAggrFunction
handler) throws
UDAException {
        }
        public void initialize( ) throws UDAException {
                total = 0;
                numInputs = 0;
        }
        public void handlePlus(Object[ ] args, Object res) throws
UDAException {
                if (args[0] == null) throw ERROR;
                int v = ((Integer)args[0]).intValue( );
                AggrFloat result = (AggrFloat)res;
                numInputs++;
                total += v;
                result.setValue((float)total/(float)numInputs);
        }
}
```

What is claimed is:

1. A data stream management system that processes a plurality of streams of data using a plurality of continuous queries, the data stream management system comprising:
a store comprising a plurality of tuples representing a relation, each tuple being time stamped;
a memory comprising a global plan currently being used in execution of the continuous queries on the plurality of streams;
a processor, coupled to said store, to modify said global plan in said memory in response to receipt of a new continuous query that uses a new aggregation defined by a command, by using an operator to invoke a first instance in a plurality of instances of the new aggregation based on a first value of an attribute of said data;
wherein said new aggregation groups data in said streams by said attribute;
wherein the processor is configured to execute an instruction in the operator, to perform the new aggregation;
wherein a first count corresponds to said first value of said attribute and said first count is changed for data of said first value by the processor;
wherein the processor is configured to create the first instance when the first count is changed from an initial value; and
wherein the processor is configured to delete the first instance when the first count is changed to return to said initial value.

2. The data stream management system of claim 1 wherein:
said operator comprises a plurality of additional counts for a corresponding plurality of additional values of said attribute.

3. The data stream management system of claim 1 wherein:
the processor is configured to check to ensure said new aggregation is identified in said new continuous query in a select list.

4. The data stream management system of claim 1 wherein:
the operator comprises a plurality of structures to hold a corresponding plurality of paths to said plurality of instances of the new aggregation.

5. The data stream management system of claim 1 wherein:
each instance in said plurality of instances of the new aggregation holds state information specific to a corresponding value of the attribute.

6. The data stream management system of claim 1 wherein:
the processor is configured to create and delete each instance in said plurality of instances in a just-in-time manner, when a window comprising data to be processed by said each instance becomes non-empty and empty respectively.

7. One or more non-transitory computer-readable storage media comprising software including instructions to process a plurality of streams of data, the instructions comprising:
instructions to store in a store a plurality of tuples representing a relation, each tuple being time stamped;
instructions to use a global plan in a memory to execute a plurality of continuous queries on the plurality of streams;
instructions responsive to receipt of a new continuous query that uses a new aggregation defined by a user command, to modify in said memory said global plan currently being used in execution of the continuous queries, by using an operator to invoke a first instance in a plurality of instances of the new aggregation based on a first value of an attribute of said data;
wherein on execution of said instructions to modify, said new aggregation groups data in said streams by said attribute;
instructions to perform the new aggregation when using said operator;
wherein a first count corresponds to said first value of said attribute and said first count is changed for data of said first value by execution of the instructions to perform;
instructions to create the first instance when the first count is changed from an initial value; and
instructions to delete the first instance when the first count is changed to return to said initial value.

8. The one or more non-transitory computer-readable storage media of claim 7 wherein:
said instructions to perform operate only on data of said first value of said attribute.

9. The one or more non-transitory computer-readable storage media of claim 7 wherein:
said operator comprises a plurality of additional counts for a corresponding plurality of additional values of said attribute.

10. The one or more non-transitory computer-readable storage media of claim 7 further comprising:
instructions to check to ensure said new aggregation is identified in said new continuous query in a select list.

11. The one or more non-transitory computer-readable storage media of claim 7 wherein:
the operator comprises a plurality of structures to hold a corresponding plurality of paths to said plurality of instances of the new aggregation.

12. The one or more non-transitory computer-readable storage media of claim 7 wherein:
each instance in said plurality of instances of the new aggregation holds state information specific to a corresponding value of the attribute.

13. The one or more non-transitory computer-readable storage media of claim 7 further comprising:
instructions to create and delete each instance in said plurality of instances in a just-in-time manner, when a window comprising data to be processed by said each instance becomes non-empty and empty respectively.

14. A method implemented in a computer of processing a plurality of streams of data, the method comprising:
storing in a store a plurality of tuples representing a relation, each tuple being time stamped;
using a global plan in a memory to execute a plurality of continuous queries on the plurality of streams;

in response to receipt of a new continuous query that uses a new aggregation defined by a command, modifying in said memory said global plan currently being used in execution of the continuous queries, by using an operator to invoke a first instance in a plurality of instances of the new aggregation based on a first value of an attribute of said data;

wherein said new aggregation groups data in said streams by said attribute;

executing at least one instruction in the operator, to perform the new aggregation;

wherein a first count corresponds to said first value of said attribute and said first count is changed for data of said first value by said executing;

creating the first instance when the first count is changed from an initial value; and deleting the first instance when the first count is changed to return to said initial value.

15. The method of claim 14 wherein:

said executing of at least one instruction operates only on data of said first value of said attribute.

16. The method of claim 14 wherein:

said operator comprises a plurality of additional counts for a corresponding plurality of additional values of said attribute.

17. The method of claim 14 further comprising:

checking to ensure said new aggregation is identified in said new continuous query in a select list.

18. The method of claim 14 wherein:

the operator comprises a plurality of structures to hold a corresponding plurality of paths to said plurality of instances of the new aggregation.

19. The method of claim 14 wherein:

each instance in said plurality of instances of the new aggregation holds state information specific to a corresponding value of the attribute.

20. The method of claim 14 further comprising:

creating and deleting each instance in said plurality of instances in a just-in-time manner, when a window comprising data to be processed by said each instance becomes non-empty and empty respectively.

* * * * *

UNITED STATES PATENT AND TRADEMARK OFFICE
CERTIFICATE OF CORRECTION

PATENT NO. : 8,204,875 B2  
APPLICATION NO. : 13/184528  
DATED : June 19, 2012  
INVENTOR(S) : Srinivasan et al.

Page 1 of 2

It is certified that error appears in the above-identified patent and that said Letters Patent is hereby corrected as shown below:

On Title page 2, item (56); in column 1, under "Other Publications", line 15, delete "l0g" and insert -- 10g --, therefor.

On Title page 2, item (56); in column 1, under "Other Publications", line 25, delete "PostgresSQL:" and insert -- PostgreSQL: --, therefor.

On Title page 2, item (56); in column 1, under "Other Publications", line 25, delete "PostgresSQL" and insert -- PostgreSQL --, therefor.

On Title page 2, item (56); in column 1, under "Other Publications", line 27, delete "PostgresSQL:" and insert -- PostgreSQL: --, therefor.

On Title page 2, item (56); in column 1, under "Other Publications", line 27, delete "PostgresSQL" and insert -- PostgreSQL --, therefor.

On Title page 2, item (56); in column 1, under "Other Publications", line 31, delete "Continuos" and insert -- Continuous --, therefor.

On Title page 2, item (56); in column 2, under "Other Publications", line 27, delete "High-Volume." and insert -- High-Volume --, therefor.

On Title page 2, item (56); in column 2, under "Other Publications", line 35, delete "Postdam," and insert -- Potsdam, --, therefor.

In column 2, line 2, delete "Standford" and insert -- Stanford --, therefor.

In column 7, line 52, delete "metada" and insert -- metadata --, therefor.

In column 8, line 7, delete ""IaggrFnFactory"" and insert -- "IaggrFnFactory" --, therefor.

Signed and Sealed this  
Fourth Day of September, 2012

David J. Kappos  
*Director of the United States Patent and Trademark Office*

CERTIFICATE OF CORRECTION (continued)
U.S. Pat. No. 8,204,875 B2

In column 8, line 9, delete ""IaggrFunction"" and insert -- "IaggrFunction" --, therefor.

In column 10, line 12, delete "tickedID" and insert -- tickerID --, therefor.

In column 11, line 17, delete "handleMinsFloat(float)" and insert -- handleMinusFloat(float) --, therefor.

In column 18, line 15, in Claim 7, after "defined by a" delete "user".